(12) United States Patent
Love et al.

(10) Patent No.: US 9,497,257 B1
(45) Date of Patent: Nov. 15, 2016

(54) FILE LEVEL REFERRALS

(75) Inventors: Philip C. Love, Alhambra, CA (US);
Udaya Bhaskar Yalamanchi, San Jose, CA (US); Per Brashers, Oakland, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 342 days.

(21) Appl. No.: 12/828,277

(22) Filed: Jun. 30, 2010

(51) Int. Cl.
*G06F 15/16* (2006.01)
*H04L 29/08* (2006.01)
*G06F 15/173* (2006.01)

(52) U.S. Cl.
CPC ........... *H04L 67/06* (2013.01); *H04L 67/1097* (2013.01); *H04L 67/2814* (2013.01); *H04L 67/2823* (2013.01)

(58) Field of Classification Search
CPC    H04L 67/06; H04L 67/1097; H04L 67/2814
USPC ................. 709/219, 213, 224, 217
See application file for complete search history.

(56) References Cited

U.S. PATENT DOCUMENTS

| | | | |
|---|---|---|---|
| 6,339,785 B1 | 1/2002 | Feigenbaum | |
| 6,578,078 B1 | 6/2003 | Smith et al. | |
| 6,826,613 B1* | 11/2004 | Wang et al. | 709/227 |
| 7,272,654 B1 | 9/2007 | Brendel | |
| 7,346,686 B2 | 3/2008 | Albert et al. | |
| 7,418,439 B2 | 8/2008 | Wong | |
| 7,552,279 B1 | 6/2009 | Gandler | |
| 7,610,304 B2 | 10/2009 | Jain et al. | |
| 7,810,092 B1 | 10/2010 | van Rietschote et al. | |
| 8,135,748 B2 | 3/2012 | Rosikiewicz et al. | |
| 8,171,201 B1 | 5/2012 | Edwards, Sr. | |
| 8,224,837 B2 | 7/2012 | Jain et al. | |
| 2002/0087654 A1* | 7/2002 | Feigenbaum | 709/214 |
| 2004/0002990 A1* | 1/2004 | Sander et al. | 707/102 |
| 2004/0024786 A1* | 2/2004 | Anderson et al. | 707/200 |
| 2005/0125503 A1* | 6/2005 | Iyengar et al. | 709/213 |
| 2006/0209695 A1 | 9/2006 | Archer et al. | |
| 2007/0055674 A1 | 3/2007 | Sunada | |
| 2009/0248701 A1 | 10/2009 | Phillips et al. | |
| 2009/0248870 A1* | 10/2009 | Kamei et al. | 709/225 |
| 2010/0281093 A1 | 11/2010 | Poder et al. | |
| 2011/0145296 A1* | 6/2011 | Ellison | G06F 17/30091 707/800 |
| 2011/0264718 A1* | 10/2011 | Chen | G06F 9/45537 707/831 |

OTHER PUBLICATIONS

Network File System (NFS) version 4 Protocol, Apr. 2003, RFC 3530, p. 117.*

* cited by examiner

*Primary Examiner* — Hee Soo Kim
(74) *Attorney, Agent, or Firm* — Dergosits & Noah LLP; Todd A. Noah

(57) ABSTRACT

A method, article of manufacture, and apparatus for accessing data. In some embodiments, this includes sending an I/O request from a client to a first server, determining, by the first server, if an object requested is in the first server, and redirecting the client to a second server if the object is not in the first server.

15 Claims, 5 Drawing Sheets

| First Server (Fatboy/10.10.33.38) | Second Server (Goldwing/10.10.36.23) | Client (Inspector/10.10.36.21) |
|---|---|---|
| ls –l output on root of export<br>[root@fatboy v4export]# ls -ltr<br>total 32<br><br>lrwxrwxrwx 1 root root 8 2009-10-20 10:02 link1 -> test/abc<br><br>lrwxrwxrwx 1 root root 8 2009-10-20 10:02 link2 -> test/def<br><br>lrwxrwxrwx 1 root root 8 2009-10-20 10:02 link3 -> test/ghi<br><br>drwxr-xr-x 4 root root 4096 2009-10-20 10:03 test<br><br>Cat of link1 (test/abc)<br>[root@fatboy v4export]# cat link1<br>total 8<br><br>drwxr-xr-x 2 root root 4096 2009-10-12 11:38 test1<br><br>drwxr-xr-x 2 root root 4096 2009-10-12 11:43 test2 | ls –l output on root of export<br>[root@glodwing referred]# ls -l<br>total 8<br>-rw-r--r-- 1 root root 62 2009-10-27 03:09 abc<br><br>-rw-r--r-- 1 root root 62 2009-10-27 03:09 def<br><br>Cat of abc<br>[root@glodwing referred]# cat abc<br>File referral success | Mount output on Client<br>10.10.33.38:/ on /mnt/v4 type nfs4 (rw,clientaddr=10.10.36.21,addr=10.10.33.38)<br><br>ls –l output on root of export<br>drwxrwxrwt 2 root root 4096 2009-10-27 03:09 test<br><br>lrwxrwxrwx 1 nobody nobody 8 2009-10-20 10:02 link3 -> test/ghi<br><br>lrwxrwxrwx 1 nobody nobody 8 2009-10-20 10:02 link2 -> test/def<br><br>lrwxrwxrwx 1 nobody nobody 8 2009-10-20 10:02 link1 -> test/abc<br><br>Cat of link1 (test/abc)<br>[root@inspector v4]# cat link1<br>File referral success |

FIG. 2

FILE LEVEL REFERRALS

CROSS REFERENCE TO RELATED APPLICATIONS

This application is related to co-pending U.S. patent application Ser. No. 12/828,279 for AUGMENTING VIRTUAL DIRECTORIES and filed concurrently herewith, which is incorporated herein by reference for all purposes; and to co-pending U.S. patent application Ser. No. 12/828,284 for VIRTUAL DISK RECOVERY and filed concurrently herewith, which is incorporated herein by reference for all purposes.

FIELD OF THE INVENTION

The present invention relates generally to data systems, and more particularly, to systems and methods of efficiently accessing information in data systems.

BACKGROUND OF THE INVENTION

Modern data systems typically include multiple devices that are geographically diverse, but which may be connected through a network. This allows a client device or machine to access files over the network, as though the file were stored in a local storage. Clients typically have fewer resources than their network server counterparts, and the network structure allows clients to access a much larger amount of data than if the client were disconnected from the network.

Different protocols have been used to facilitate the transmission of data in a network structure. One such protocol is the Network File System (NFS). The current version of NFS is version 4.1. One benefit of NFS is that it is able to perform directory referrals. If a client wanted to access a directory on a first server, but the first server did not have the directory, the first server would be able to determine a second server which did have the directory, and refer the client to the second server.

However, current NFS protocols do not perform file level referrals. There is a need, therefore, for an improved method, article of manufacture, and apparatus for accessing information in data systems.

BRIEF DESCRIPTION OF THE DRAWINGS

The present invention will be readily understood by the following detailed description in conjunction with the accompanying drawings, wherein like reference numerals designate like structural elements, and in which:

FIG. 2 illustrates sample output of a first server, a second server, and a client in accordance with some embodiments.

DETAILED DESCRIPTION

Figure 1:
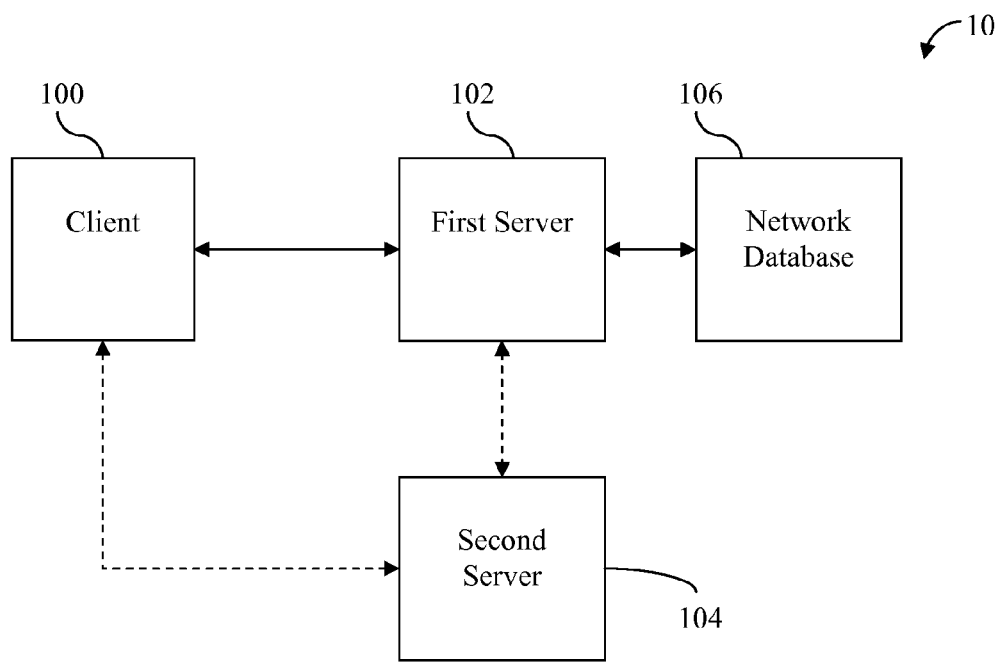
FIG. 1 is a diagram of a data system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data system configured to store files, but it should be understood that the principles of the invention are not limited to data systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

FIG. 1 illustrates a data system in accordance with some embodiments of the present invention. Data System 10 has Client 100, First Server 102, Second Server 104, and Network Database 106. Client 100 may access data stored in First Server 102, store data in First Server 102, or otherwise perform input output (I/O) operations on First Server 102. When Client 100 sends a request to access data on First Server 102, First Server 102 either allows access to the data, or attempts to locate the data. First Server may locate the data by utilizing Network Database 106. Network Database 106 contains information about all the data in the network, such as the data's location, file names, etc. For example, when the data is on First Server 102, First Server 102 will allow Client 100 to access the data. When the data is not on First Server 102, First Server 102 will attempt to locate the data by contacting Network Database 106. Network Database 106 may tell First Server 102 that the data requested is stored on Second Server 104, and First Server 102 will act accordingly (e.g. redirect Client 100 to Second Server, or acting as a middle man between Client 100 and Second Server 102).

There may be various reasons why data would not be located on First Server 102. These reasons may include storing rarely accessed data in a secondary server, storing different data types in different servers, storing high priority data in a primary server, and storing data belonging to different owners in different servers, and different file systems in different servers, among others.

In some embodiments, when First Server 102 attempts to locate data, First Server 102 may directly connect to Second Server 104 and access the data on Second Server 104. In this way, First Server 102 acts as a middle man between Client 100 and Second Server 104. This is illustrated by the dashed line between First Server 102 and Second Server 104 in FIG. 1.

In some embodiments, when First Server 102 attempts to locate data, it may send information to Client 100 on how to find the data on Second Server 104. For example, First Server may send information to Client 100 on the address of Second Server 104, along with information on the data structure of Second Server 104 and where to find the relevant data in Second Server 104. Client 100 then uses this information to locate Second Server 104 and access the data on Second Server 104. This is illustrated by the dashed line connecting Client 100 and Second Server 104 in FIG. 1. In some embodiments, First Server 104 may send a fs_location file to Client 100.

Though FIG. 1 illustrates a single Client 100, multiple clients may access First Server 102. Further, Data System 10 may be a cloud computing system, and First Server 102 and Second Server 104 may be part of a cloud computer system. Cloud computing is well understood in the art, and generally includes provisioning dynamically scalable and often virtualized resources as a service over the internet. Thus, in a cloud computing system, First Server 102 may be a virtual server and actually reside over multiple physical servers. Similarly, in a cloud computing system, there may be multiple virtual servers in a physical server. Accordingly, First Server 102 and Second Server 104 may be virtual servers, and reside in a single physical server or multiple physical servers. Further, though FIG. 1 illustrate only two servers, many more servers may be utilized. For example, a data system may contain ten servers. A network database may contain information about all the data across the ten servers. File X resides on servers 3, 4, and 5. If a client asked server 1 to access File X, server 1 may contact the network database to determine that File X is on servers 3, 4, and 5. Server 1 may then forward that information to the client, and the client may choose to connect to any one server, any two servers, or all 3 servers. When connecting to multiple servers, the client may receive portions of File X from the multiple servers (e.g. half of File X from server 3, and the other half of File X from server 4.)

As discussed above, conventional protocols can not perform file level referrals, only directory level referrals. In some embodiments, to perform a file level referral for File X, a file stub may be used. The file stub may be stored in First Server, as part of a namespace tree. The file stub may be a file that contains the file level junction information. File level junction information may be metadata stored internally on First Server that describes the linking between two items on the servers. In some embodiments, it may be preferable for the contents of the file stub, or the file stub itself, to not be visible to a client. Rather, the contents of the file stub are processed by a data mover function, which regenerates a file level referral for the client.

In some embodiments, soft links may be used. Soft links lets links point to files in a directory that would usually be referred. FIG. 2 illustrates sample output of a client, a first server, and a second server using soft links.

First, Client (Inspector) mounts First Server (Fatboy). After mounting, a list function (ls) performed on Inspector would show test, link 3, link 2, and link 1. Notice that a ls function on Fatboy would produce the same results. When Inspector performs the first ls function, to Inspector, it seems like the files are on Fatboy. However, when Inspector tries to access link1, Inspector is informed that link1 is not on Fatboy, but rather on Second Server (Goldwing). A ls function on Goldwing shows files abc and def. An access of abc on Goldwing would display the results "File referral success." Thus, when Inspector accesses link1, it will be referred to abc on Goldwing, and come up with the same results: "File referral success."

In some embodiments, Inspector, Goldwing, and Fatboy may utilize the NSF v4 or v4.1 protocol to communicate with each other. When Inspector attempts to access link1, Fatboy will send an "error mount" type message, indicating that Fatboy does not contain link1. Inspector will then send a request for the location of link1 (such as an fs_location) to Fatboy. Fatboy then sends the location of link 1 (e.g. Goldwing/).

Figure 3:
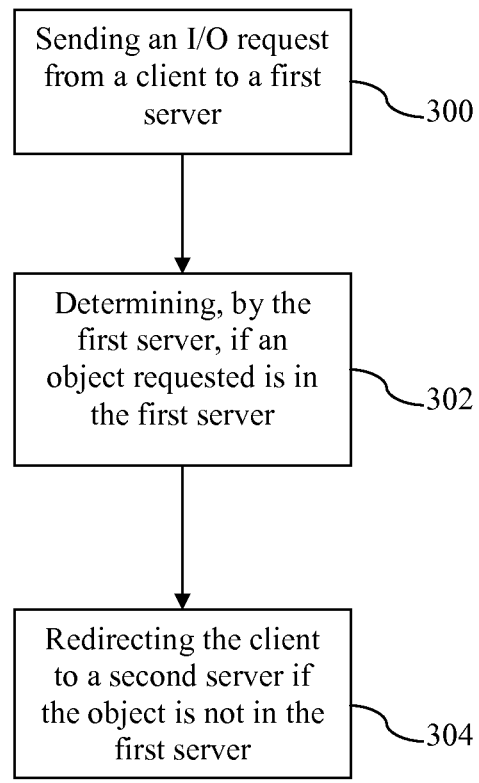
FIG. 3 is a flowchart of a method to access data in accordance with some embodiments.

FIG. 3 illustrates a method to access data in accordance with some embodiments. In step 300, an I/O request is sent from a client to a first server. In step 302, the first server determines if an object requested is in the first server. In step 304, the client is redirected to a second server if the object is not in the first server.

First Server 102 and Second Server 104 may utilize a variety of network protocols. In some embodiments, First Server 102 may be a Celerra server, a product available from EMC Corporation, utilizing the NFS v4.1 protocol.

In some embodiments, the data requested by Client 100 may be data stored in a virtual environment, including data such as virtual machine disks (VMDKs). Since VMDKs are data objects (e.g. files) and not directories, conventional referral protocols are unable to refer VMDKs from server to server. Using the enhanced techniques described herein, a Client 100 may be able to request access to a VMDK on a First Server 102, and a file level referral may refer Client 100 to a Second Server 104.

In some embodiments, a virtual environment may be used. Every directory in the virtual environment has a hidden virtual directory ".container." Inside ".container" are the containers associated with a fileset. When a client changes directory into ".container" (e.g. cd .container), the client is in a virtual location. When the client asks for a list of the current .container directory (e.g. 1s), a list of containers is shown. When a client changes directory into a container (e.g. cd container1), a server may return a referral to the actual container location. This may be accomplished using the standard NFSv4.1 directory referral feature. In this case, "container1" is a directory level junction. For file level junctions, a client creates a symlink (or symbolic link) for a VMDK file. The symlink follows into the .container directory (e.g. .container/container1/file.vmdk). The client also creates a VMDK in the container.

Figure 4:
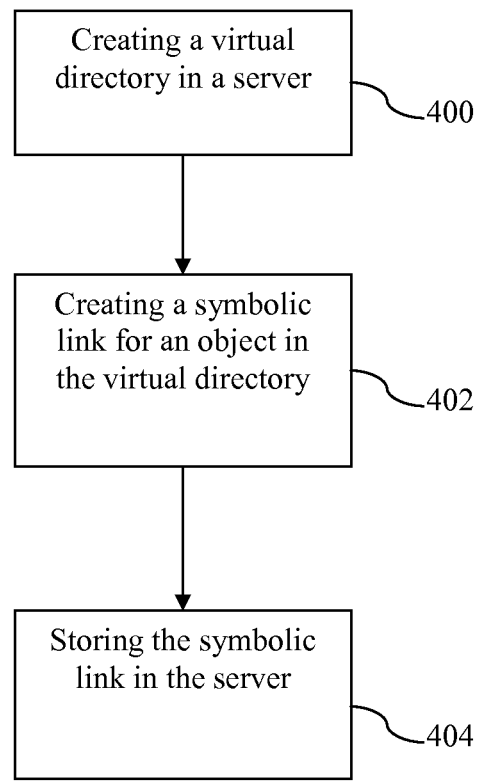
FIG. 4 is a flowchart of a method to link data in accordance with some embodiments.

FIG. 4 illustrates a method to link data in accordance with some embodiments. In step 400, a virtual directory is created in the server. In step 402, a symbolic link for an object is created in the virtual directory. In step 404, the symbolic link is stored in the server.

In some embodiments, a first server may be a repository of VMDKs. When a client accesses the repository, and executes a ls command (e.g. list the files in the directory), a list of VMDKs will be generated. However, as described herein, some, many, or all of the VMDKs may not actually reside in the "repository" (e.g. the first server). There may be several reasons why a repository may not physically contain all the VMDKs. Such reasons include allocating higher priority VMDKs to high performance devices, such as solid state devices, while allocating lower priority VMDKs to lower performance devices to save costs. For example, a CEO's VMDK may be stored in a high performance solid state device, while an entry level employee's VMDK may be stored in a cheaper, lower performing device. However, for ease of management, it may be desirable to have a central repository where all the VMDKs are "located." Otherwise, it may be too difficult for the virtual machine disk manager to keep track of all the virtual machine disks if they were scattered across multiple directories in multiple servers. Thus, file level referrals allow for a central repository of VMDKs, yet also accommodate having different VMDKs in different physical devices.

Figure 5:
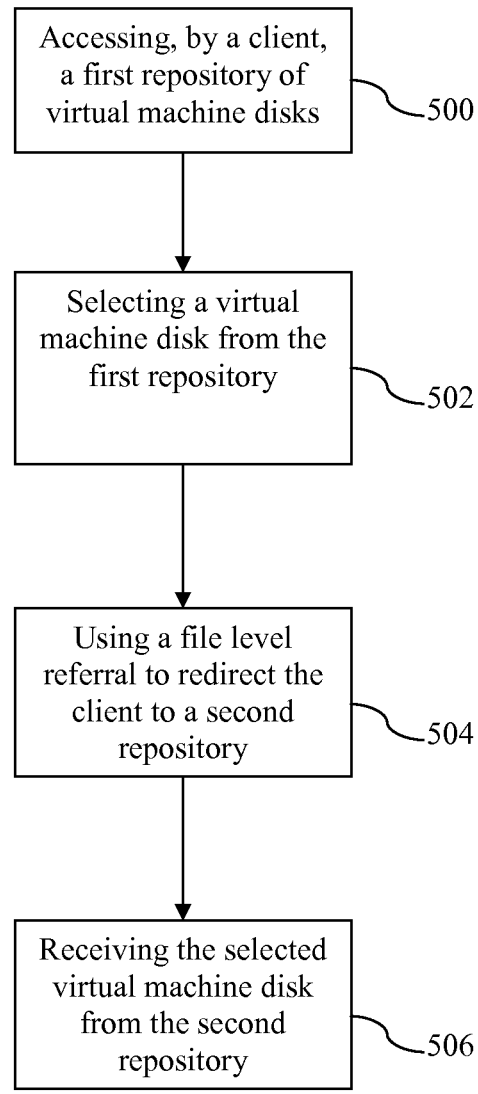
FIG. 5 is a flowchart of a method to mount virtual machine disks in accordance with some embodiments.

FIG. 5 illustrates a method to mount virtual machine disks in accordance with some embodiments. In step 500, a client accesses a first repository of virtual machine disks. In step 502, a virtual machine disk is selected from the first repository. In step 504, a file level referral is used to redirect the client to a second repository. In step 506, the selected virtual machine is received from the second repository.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for accessing data, comprising:
   receiving, by a first file server, an I/O request for a virtual machine disk from a client, wherein the first file server comprises a repository storing a virtual directory comprising symbolic links to a plurality of virtual machine disks;
   determining, by the first file server, if the requested virtual machine disk is stored on a the first file server;
   redirecting the client, by the first file server, to a second file server and a third file server if the virtual machine disk is not in the first file server, wherein redirecting the client comprises:
      sending, by the first file server, an error mount message to the client;
      receiving, by the first file server, a request for the virtual machine disk's location from the client; and
      sending, by the first file server, a first symbolic link from the virtual directory of a second server location associated with the second file server and a second symbolic link from the virtual directory of a third server location associated with the third file server to the client; and
   transmitting, by the first file server, portions of the virtual machine disk file to the client from both the second file server and the third file server.

2. The method as recited in claim 1, wherein redirecting the client to a second file server includes redirecting the client based on a file level referral.

3. The method as recited in claim 1, wherein the client, first file server, and second file server utilize the NFSv4.x protocol.

4. The method as recited in claim 1, wherein the first file server is a virtual server.

5. The method as recited in claim 1, wherein the second file server is a virtual server.

6. A system for accessing data, comprising:
   a processor configured to:
   receiving, by a first file server, an I/O request for a virtual machine disk from a client, wherein the first file server comprises a repository storing a virtual directory comprising symbolic links to a plurality of virtual machine disks;
   determining, by the first file server, if the requested virtual machine disk is stored on a the first file server;
   redirecting the client, by the first file server, to a second file server and a third file server if the virtual machine disk is not in the first file server, wherein redirecting the client comprises:
      sending, by the first file server, an error mount message to the client;
      receiving, by the first file server, a request for the virtual machine disk's location from the client; and sending, by the first file server, a first symbolic link from the virtual directory of a second server location associated with the second file server and a second symbolic link from the virtual directory of a third server location associated with the third file server to the client; and transmitting, by the first file server, portions of the virtual machine disk file to the client from both the second file server and the third file server.

7. The system as recited in claim 6, wherein redirect the client to a second file server includes redirect the client based on a file level referral.

8. The system as recited in claim 6, wherein the client, first file server, and second file server utilize the NFSv4.x protocol.

9. The system as recited in claim 6, wherein the first file server is a virtual server.

10. The system as recited in claim 6, wherein the second file server is a virtual server.

11. A computer program product for accessing data, comprising a non-transitory computer usable medium having machine readable code embodied therein for:

receiving, by a first file server, an I/O request for a virtual machine disk from a client, wherein the first file server comprises a repository storing a virtual directory comprising symbolic links to a plurality of virtual machine disks;

determining, by the first file server, if the requested virtual machine disk is stored on a the first file server;

redirecting the client, by the first file server, to a second file server and a third file server if the virtual machine disk is not in the first file server, wherein redirecting the client comprises:

sending, by the first file server, an error mount message to the client;

receiving, by the first file server, a request for the virtual machine disk's location from the client; and sending, by the first file server, a first symbolic link from the virtual directory of a second server location associated with the second file server and a second symbolic link from the virtual directory of a third server location associated with the third file server to the client; and transmitting, by the first file server, portions of the virtual machine disk file to the client from both the second file server and the third file server.

12. The computer program product as recited in claim 11, wherein redirecting the client to a second file server includes redirecting the client based on a file level referral.

13. The computer program product as recited in claim 11, wherein the client, first file server, and second file server utilize the NFSv4.x protocol.

14. The computer program product as recited in claim 11, wherein the first file server is a virtual server.

15. The computer program product as recited in claim 11, wherein the second file server is a virtual server.

* * * * *